United States Patent
Kim et al.

(10) Patent No.: US 9,985,458 B2
(45) Date of Patent: May 29, 2018

(54) METHOD OF POWER TRANSMITTING UNIT (PTU) FOR DETERMINING LOCATION OF POWER RECEIVING UNIT (PRU), AND PTU EMPLOYING THE METHOD

(71) Applicant: Samsung Electronics Co., Ltd., Suwon-si (KR)

(72) Inventors: Bong Chul Kim, Seoul (KR); Sang Wook Kwon, Seongnam-si (KR); Ki Young Kim, Yongin-si (KR); Dong Zo Kim, Yongin-si (KR); Yun Kwon Park, Dongducheon-si (KR); Jae Hyun Park, Yongin-si (KR); Keum Su Song, Seoul (KR); Chi Hyung Ahn, Suwon-si (KR); Young Ho Ryu, Yongin-si (KR); Byoung Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 14/474,853

(22) Filed: Sep. 2, 2014

(65) Prior Publication Data
US 2015/0077051 A1 Mar. 19, 2015

(30) Foreign Application Priority Data

Sep. 13, 2013 (KR) .................. 10-2013-0110186

(51) Int. Cl.
*H02J 7/00* (2006.01)
*H02J 7/02* (2016.01)
*H02J 50/40* (2016.01)
*H01F 38/14* (2006.01)
*H02J 50/12* (2016.01)
*H02J 50/90* (2016.01)

(52) U.S. Cl.
CPC .............. *H02J 7/025* (2013.01); *H01F 38/14* (2013.01); *H02J 50/12* (2016.02); *H02J 50/40* (2016.02); *H02J 50/90* (2016.02)

(58) Field of Classification Search
USPC ........................................................ 320/108
See application file for complete search history.

(56) References Cited

U.S. PATENT DOCUMENTS

2010/0189197 A1 7/2010 Nakatani
2011/0081857 A1 4/2011 Lee et al.
(Continued)

FOREIGN PATENT DOCUMENTS

KR 10-1213649 B1 12/2012
WO WO 2013/077086 A1 5/2013

OTHER PUBLICATIONS

International Search Report dated Dec. 11, 2014, in counterpart International Application No. PCT/KR2014/008228 (3 pages, in English).

(Continued)

Primary Examiner — Robert Grant
(74) Attorney, Agent, or Firm — NSIP Law

(57) ABSTRACT

A power transmitting unit (PTU) transmits a power wirelessly based on a location of a power receiving unit (PRU). The PTU determines whether the PRU is located within a charging area of the PTU based on frequency information corresponding to an inflection point detected on a curve of electrical characteristics of a resonator of the PTU.

23 Claims, 16 Drawing Sheets

(56) References Cited

U.S. PATENT DOCUMENTS

2011/0241437 A1    10/2011  Kanno
2012/0038220 A1     2/2012  Kim et al.
2012/0280575 A1*   11/2012  Kim ....................... H02J 17/00
                                                              307/104
2013/0154557 A1*    6/2013  Lee ...................... H04B 5/0037
                                                              320/108

OTHER PUBLICATIONS

Extended European Search Report issued by the European Patent Office dated April 18, 2017, for the corresponding EP Patent Application No. 148432719 (8 pages in English).

* cited by examiner

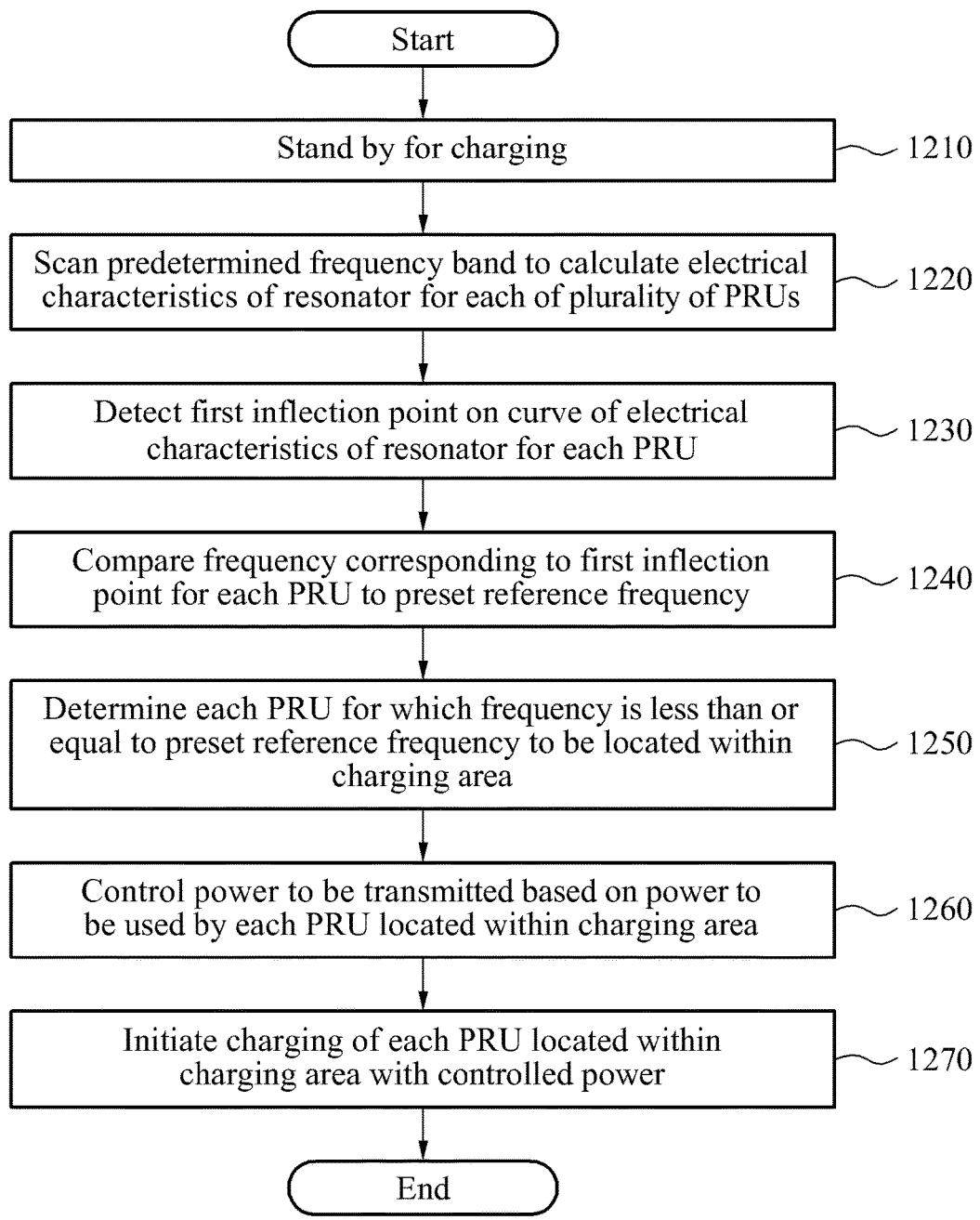

METHOD OF POWER TRANSMITTING UNIT (PTU) FOR DETERMINING LOCATION OF POWER RECEIVING UNIT (PRU), AND PTU EMPLOYING THE METHOD

CROSS-REFERENCE TO RELATED APPLICATIONS

This application claims the benefit under 35 USC 119(a) of Korean Patent Application No. 10-2013-0110186 filed on Sep. 13, 2013, in the Korean Intellectual Property Office, the entire disclosure of which is incorporated herein by reference for all purposes.

BACKGROUND

1. Field

The following description relates to technology in which a power transmitting unit (PTU) determines a location of a power receiving unit (PRU) in wireless power transmission.

2. Description of Related Art

Research on wireless power transmission has been ongoing to alleviate increasingly common inconveniences caused by wired power supplies and the limited capacity of batteries resulting from an explosive increase in various mobile devices, such as electric vehicles and mobile electronic devices. One wireless power transmission technology uses resonance characteristics of radio frequency (RF) devices. A wireless power transmission system using resonance characteristics may include a PTU that supplies power, and a PRU that receives power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power transmitting unit (PTU) includes a resonating unit including a resonator and configured to transmit a power to a power receiving unit (PRU) that mutually resonates with the resonator at a resonant frequency of the resonator; and a controller configured to determine whether the PRU is located within a charging area of the PTU based on frequency information corresponding to an inflection point on a curve of electrical characteristics of the resonator.

The resonating unit may be further configured to transmit a charging power to the PRU in response to the controller determining that the PRU is located within the charging area.

The electrical characteristics of the resonator may include any one or any combination of a voltage gain, a current gain, and a power gain of the resonator.

The controller may be further configured to determine that the PRU is located within the charging area in response to a frequency corresponding to a first inflection point detected by scanning a predetermined frequency band on the curve being less than or equal to a preset reference frequency.

The controller may include an electrical characteristics calculator configured to calculate the electrical characteristics of the resonator based on information received from the PRU; an inflection point detector configured to detect an inflection point of the curve by scanning a predetermined frequency band on the curve of the calculated electrical characteristics; a comparator configured to compare a frequency corresponding to a first detected inflection point to a preset reference frequency; and a determiner configured to determine whether the PRU is located within the charging area based on a result of the comparing.

The resonator may include a capacitor; and the controller may include an electrical characteristics calculator configured to calculate the electrical characteristics of the resonator based on information received from the PRU; an inflection point detector configured to detect an inflection point of the curve by scanning a predetermined frequency band on a curve of the calculated electrical characteristics; a coupling coefficient detector configured to detect a change in a coupling coefficient between the resonator and the PRU based on a voltage of the capacitor of the resonator; and a determiner configured to determine whether the PRU is located within the charging area based on a coupling coefficient corresponding to a first inflection point, among detected inflection points of the curve, and the detected change in the coupling coefficient.

The resonator may have a shape of a two-dimensional (2D) pad; and the controller may be further configured to determine whether the PRU is located within the charging area on the 2D pad.

The resonator may have a shape configured to radiate the power to a three-dimensional (3D) space; and the controller may be further configured to determine whether the PRU is located within the charging area in the 3D space.

The PTU may further include a communication unit configured to communicate with the PRU to receive information on a power received by the PRU and information on a power to be used by the PRU.

The PRU may include a reception resonator configured to receive the power; the resonator of the resonating unit may be either a series resonator or a parallel resonator; and the reception resonator may be either a series resonator or a parallel resonator.

In another general aspect, a power transmitting unit (PTU) includes a resonating unit including a resonator, the resonator including a capacitor, the resonating unit being configured to transmit a power to a power receiving unit (PRU) that mutually resonates with the resonator at a resonant frequency of the resonator; and a controller configured to detect a change in a voltage of the capacitor, calculate a change in a coupling coefficient between the PRU and the resonator based on the detected change in the voltage, and determine whether the PRU is located within a charging area of the PTU based on the change in the coupling coefficient.

The resonating unit may be further configured to transmit the power to a PRU determined to be located within the charging area based on a result of the determining.

The controller may include an electrical characteristics calculator configured to calculate electrical characteristics of the resonator for each of a plurality of PRUs based on information received from the plurality of PRUs; an inflection point detector configured to detect an inflection point of a curve of the calculated electrical characteristics by scanning a predetermined frequency band on the curve; a comparator configured to compare a frequency corresponding to a first detected inflection point to a preset reference frequency; and a determiner configured to determine a PRU located within the charging area, among the plurality of PRUs, based on a result of the comparing.

In another general aspect, a method of a power transmitting unit (PTU) for determining a location of a power receiving unit (PRU) includes transmitting a power to a PRU that mutually resonates with a resonator of the PTU at a resonant frequency of the resonator; and determining whether the PRU is located within a charging area of the PTU based on frequency information corresponding to an inflection point on a curve of electrical characteristics of the resonator.

The transmitting may include transmitting a charging power to the PRU in response to the PRU being determined to be located within the charging area.

The electrical characteristics of the resonator may include any one or any combination of a voltage gain, a current gain, and a power gain of the resonator.

The determining may include determining that the PRU is located within the charging area in response to a frequency corresponding to a first inflection point detected by scanning a predetermined frequency band on the curve being less than or equal to a preset reference frequency.

The determining may include calculating the electrical characteristics of the resonator based on information received from the PRU; detecting an inflection point of the curve by scanning a predetermined frequency band on a curve of the calculated electrical characteristics; comparing a frequency corresponding to a first detected inflection point to a preset reference frequency; and determining whether the PRU is located within the charging area based on a result of the comparing.

The determining may include calculating the electrical characteristics of the resonator based on information received from the PRU; detecting an inflection point of the curve by scanning a predetermined frequency band on the curve of the calculated electrical characteristics; detecting a change in a coupling coefficient based on a voltage of a capacitor of the resonator; and determining whether the PRU is located within the charging area based on a coupling coefficient corresponding to a first inflection point, among detected inflection points of the curve, and the detected change in the coupling coefficient.

The method may further include communicating with the PRU to receive information on a power received by the PRU and information on a power to be used by the PRU.

In another general aspect, a power transmitting unit (PTU) includes a resonating unit including a resonator and configured to transmit a power to a power receiving unit (PRU) that mutually resonates with the resonator at a resonant frequency of the resonator; and a controller configured to determine whether the PRU is located within a charging area of the PTU based on a coupling coefficient between the resonator and the PRU.

The controller may be further configured to determine that the PRU is located within the charging area in response to the coupling coefficient being greater than or equal to a predetermined coupling coefficient.

The controller may be further configured to determine the coupling coefficient based on an inflection point on a curve of electrical characteristics of the resonator.

Other features and aspects will be apparent from the following detailed description, the drawings, and the claims.

BRIEF DESCRIPTION OF THE DRAWINGS

FIG. 12 illustrates another example of a method of a PTU for determining a location of a PRU.

DETAILED DESCRIPTION

Figure 1:
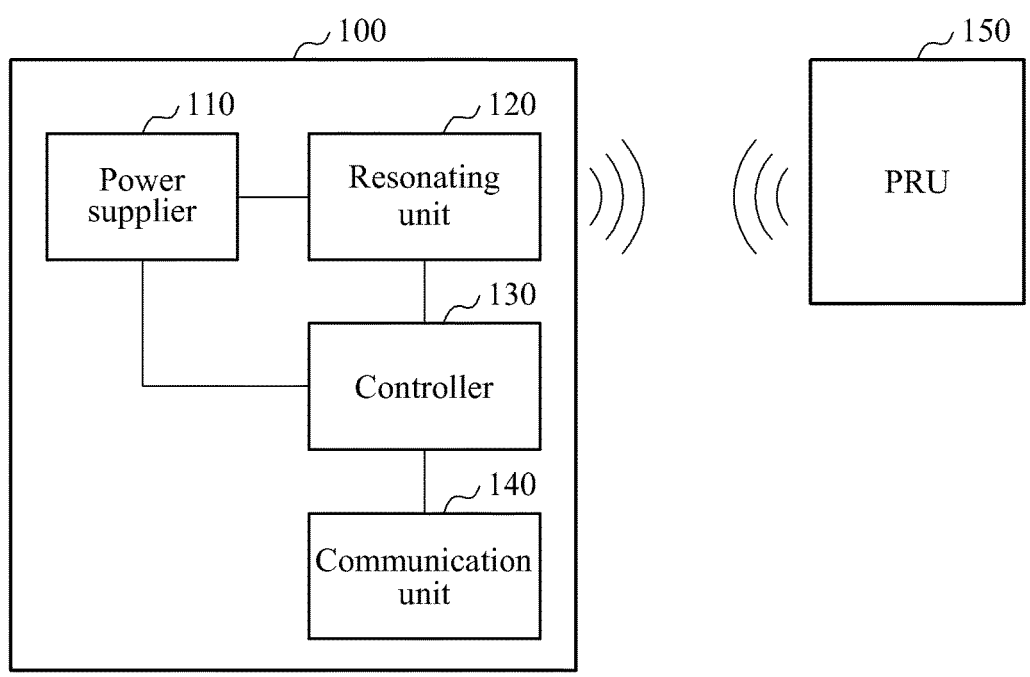
FIG. 1 illustrates an example of a power transmitting unit (PTU).

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Due to characteristics of wireless power transmission technology, various charging environments may occur depending on a location relationship between a power transmitting unit (PTU) that transmits a power and a power receiving unit (PRU) that receives a power. In general, to design a system having a relatively high transmission efficiency in various charging environments, a resonator may need to be designed to have an increased size and a complex structure.

Electrical characteristics of a resonator may be used for various determinations with respect to a charging environment. Location information of a PRU may also be used for the determination. In one example, whether a power is to be transmitted may be determined based on the location information of the PRU. In another example, when a plurality of PRUs are located within a power transmission area of a single PTU, the PTU may operate suitably for a charging environment that varies based on a location of each PRU.

Hereinafter, a method of determining whether a PTU and a PRU are disposed at suitable locations for charging in a wireless power transmission system including the PTU and the PRU will be described. The method may be employed for all products or systems to which wireless power transmission is applicable.

Due to characteristics of wireless power transmission technology, parameter characteristics of a resonator will change based on a distance and an angle between a PTU and a PRU, and a great deviation of efficiency may occur. A resonator capable of maintaining a relatively high efficiency may be designed, and a wireless power efficiency may be increased by determining whether the PTU and a PRU are disposed within a set distance and a set angle. For example, when a plurality of PRUs are located in a power transmission area of a single PTU, a charging environment may vary depending on a location of each PRU. Thus, when relative locations of the PTU and the PRU are determined, a series of actions to increase or maintain the wireless power efficiency may be performed.

FIG. 1 illustrates an example of a PTU 100.

Referring to FIG. 1, the PTU 100 includes a power supplier 110, a resonating unit 120, a controller 130, and a communication unit 140.

The power supplier 110 supplies a power to the resonating unit 120. The power supplier 110 may supply the resonating unit 120 with an alternating current (AC) voltage converted using a resonant frequency of a resonator (not shown) of the resonating unit 120. The resonating unit 120 transmits, to a PRU 150, the power supplied from the power supplier 110 through a mutual resonance with the PRU 150 using the resonator. The resonating unit 120 transmits the power to the PRU 150, which mutually resonates with the resonator of the resonating unit 150 at the resonant frequency of the resonator. The PRU 150 also includes a resonator. The resonator of the PRU 150 receives a power from the resonating unit 120. When the controller 130 determines that the PRU 150 is located within a charging area of the PTU 100, the resonating unit 120 transmits a charging power to the PRU 150. The charging area may be an area set to be provided at a predetermined angle, in a predetermined direction, and at a predetermined distance from the PTU 100.

The controller 130 determines whether the PRU 150 is located within the charging area based on frequency information corresponding to an inflection point detected on a curve of electrical characteristics of the resonator. The electrical characteristics of the resonator may include any one or any combination of a voltage gain, a current gain, and a power gain of the resonator. The controller 130 may detect the inflection point by scanning or sweeping a predetermined frequency band on the curve of the electrical characteristics of the resonator. When a frequency corresponding to a first inflection point, among detected inflection points, is less than or equal to a preset reference frequency, the controller 130 determines that the PRU 150 is located within the charging area.

A coupling coefficient K may be changed based on a distance or an angle between a PTU and a PRU. The coupling coefficient K may be defined by the following Equation 1.

$$K=M/\sqrt{L_1 L_2} \quad (1)$$

In Equation 1, M denotes a mutual inductance between the resonators included in the resonating unit 120 and the PRU 150, and $L_1$ and $L_2$ respectively denote magnetic inductances of the resonators included in the resonating unit 120 and the PRU 150. The mutual inductance M is a proportional constant related to relative locations of both resonators forming an inductive coupling. Thus, when the distance or the angle between the PTU and the PRU is changed, the relative locations of the resonators included in the PTU and the PRU is changed, and the mutual inductance M is changed. Based on the definition of the coupling coefficient K, a change in the mutual inductance M will result in a change in the coupling coefficient K. Accordingly, the change in the distance or the angle between the PTU and the PRU will result in the change in the coupling coefficient K.

The PTU 100 may detect a change in the coupling coefficient K without receiving information from the PRU 150. A change in the distance or the angle between the PTU 100 and the PRU 150 will result in a change in an inductance of the resonator of the PRU 150, and the change in the inductance of the resonator of the PRU 150 will result in a change in a voltage of a capacitor of the resonator included in the resonating unit 120. Thus, the PTU 100 may detect a change in the coupling coefficient K by detecting a change in the voltage of the capacitor of the resonator included in the resonating unit 120. The change in the coupling coefficient K may be used to monitor whether a PRU located within the charging area continuously exists within the charging area.

The controller 130 may detect a frequency corresponding to a first inflection point on a curve of voltage gain characteristics of the resonator, and compare the detected frequency to a predetermined reference frequency. When the detected frequency is less than or equal to the reference frequency, the controller 130 determines that the PRU 150 is located within the charging area. In another example, when the reference frequency is determined based on a frequency corresponding to an odd-numbered inflection point, the controller 130 may similarly detect the frequency corresponding to the odd-numbered inflection point, and determine whether the PRU 150 is located within the charging area. The controller 130 may detect a frequency corresponding to an odd-numbered inflection point on a curve of voltage gain characteristics of the resonator, and compare the detected frequency to a predetermined reference frequency. When the detected frequency is less than or equal to the reference frequency, the controller 130 determines that the PRU 150 is located within the charging area.

Although voltage gain characteristics are provided as an example of the electrical characteristics of the resonator in the above description, the description is also applicable to current gain characteristics and power gain characteristics.

The communication unit 140 may perform in-band communication or out-of-band communication to receive information on a power received by the PRU 150 and information on a power to be used by the PRU 150. In the in-band communication, a power and a signal are transmitted within a coupling area between a resonator of a PTU and a resonator of a PRU. Thus, in contrast to the out-of-band communication, the in-band communication may cause less interference in ambient devices. The out-of-band communication refers to communication using a communication channel, for example, Zigbee or Bluetooth. In the in-band communication, data may be transmitted using a power transmission channel.

The controller 130 calculates any one or any combination of a voltage gain, a current gain, and a power gain of the resonator of the resonating unit 120 based on the received information on the power received by the PRU 150 by scanning the predetermined frequency band. The controller 130 may calculate the electrical characteristics of the resonator based on a test power to reduce a power consumption until it is determined whether the PRU 150 is located within the charging area of the PTU 100. The controller 130 may calculate the electrical characteristics of the resonator based on the information received by the communication unit 140 by scanning the predetermined frequency band.

The resonator may be provided in various two-dimensional (2D) or three-dimensional (3D) forms. In an example, the resonator may be provided in a form of a 2D pad. The controller 130 may determine whether the PRU 150 is located within the charging area on the 2D pad based on a frequency corresponding to an inflection point of the curve of the electrical characteristics of the resonator. In another example, a 3D resonator may have various forms to radiate a power to a 3D space. For example, the resonator may be provided in a form of a hexahedron or a cylinder. The controller 130 may determine whether the PRU 150 is located within the charging area in the 3D space based on a frequency corresponding to an inflection point of the curve of the electrical characteristics of the resonator. Examples of the resonator provided in such a 2D or 3D form will be described in detail with reference to FIGS. 2 and 3.

Figure 2:
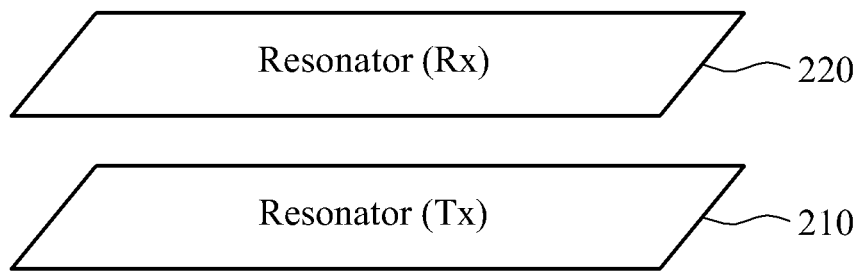
FIGS. 2 and 3 illustrate examples of configurations of a resonator of a resonating unit of a PTU.
Figure 3:
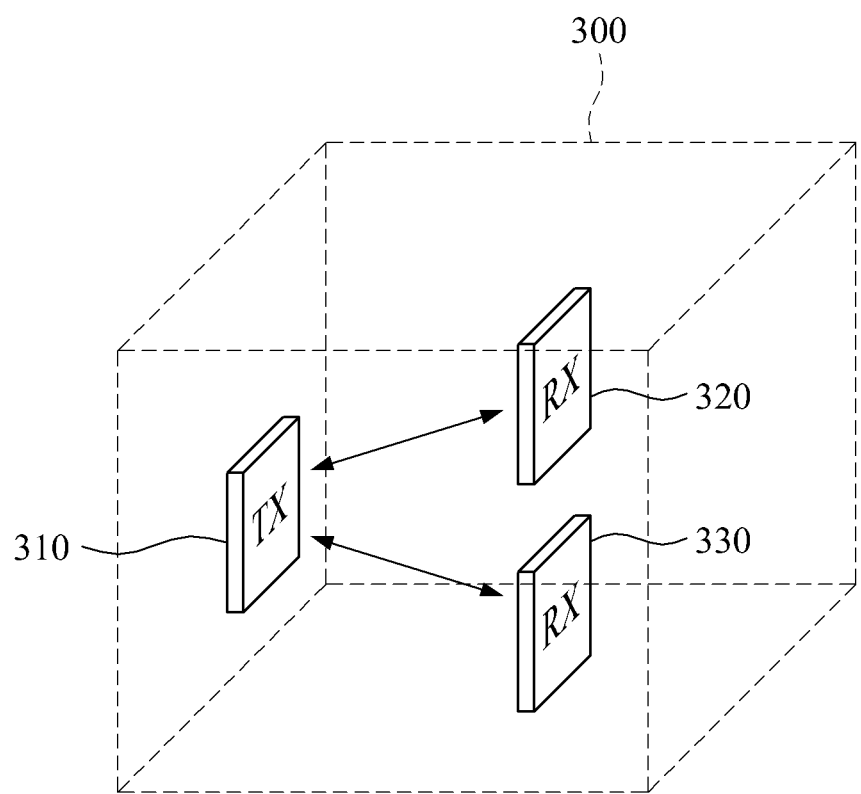

FIGS. 2 and 3 illustrate examples of configurations of a resonator of a resonating unit of a PTU.

Referring to FIG. 2, a resonator 210 is provided in a form of a 2D pad. A resonator 220 is provided in a PRU. The resonator 210 transmits a power in an upper direction and a lower direction. As a location of the resonator 220 is changed, a coupling coefficient K between the resonator 210 and the resonator 220 is changed. A PTU may determine whether the resonator 220 is located within a charging area of the PTU by comparing a frequency corresponding to an inflection point of a curve of electrical characteristics of the resonator 210 to a reference frequency.

Referring to FIG. 3, a resonator 310 transmits a power to a 3D space 300. The resonator 310 is provided in a PTU that transmits a power wirelessly. A resonator 320 is provided in a first PRU, and a resonator 330 is provided in a second PRU. The first PRU and the second PRU are located in the 3D space 300. The PTU may determine whether the resonator 320 or the resonator 330 is located within a charging area of the PTU by comparing a frequency corresponding to an inflection point of a curve of electrical characteristics of the resonator 310 to a reference frequency for each of the resonators 320 and 330.

Figure 4:
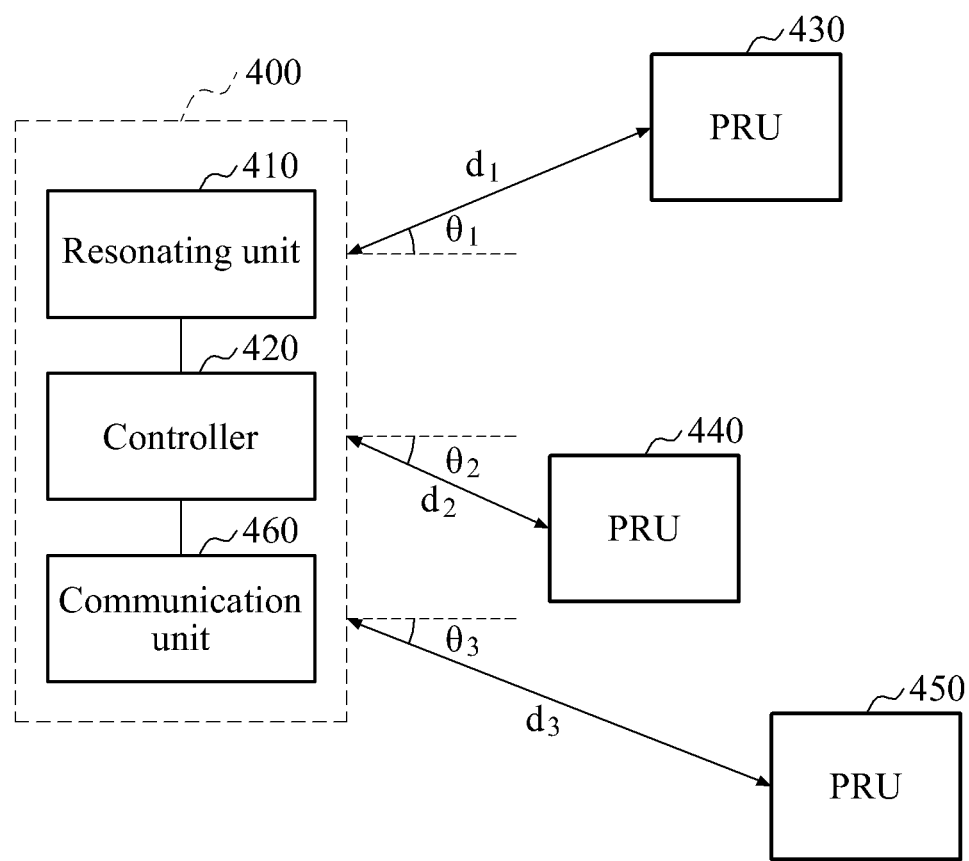
FIG. 4 illustrates another example of a PTU.

FIG. 4 illustrates another example of a PTU 400.

Referring to FIG. 4, the PTU 400 includes a resonating unit 410, a controller 420, and a communication unit 460. The resonating unit 410 transmits a power to a plurality of PRUs 430, 440, and 450 that mutually resonate with a resonator of the resonating unit 410 (not shown) at a resonant frequency of the resonator. The resonating unit 410 may receive a power having an AC voltage of the resonant frequency from a power source (not shown). The resonating unit 410 transmits a charging power to a PRU determined to be located within the charging area of the PTU 400 based on a result of determining performed by the controller 420. The resonating unit 410 may transmit a test power before the determination is performed by the controller 420. The controller 420 may calculate electrical characteristics of the resonator of the resonating unit 410 based on the test power transmitted by the resonating unit 410.

The charging area is an area set to be provided at a predetermined angle, in a predetermined direction, and at a predetermined distance from the PTU 400. A distance and an angle between the PTU 400 and the PRU 430 are $d_1$ and $\theta_1$, respectively. A distance and an angle between the PTU 400 and the PRU 440 are $d_2$ and $\theta_2$, respectively. A distance and an angle between the PTU 400 and the PRU 450 are $d_3$ and $\theta_3$, respectively. The PRUs 430, 440, and 450 are present in various charging environments based on the distances and the angles. For example, the PTU 400 may determine that the PRU 440 at the distance $d_2$ and the angle $\theta_2$ is located within the charging area.

The controller 420 may determine a PRU located within the charging area, among the plurality of PRUs 430, 440, and 450, based on frequency information corresponding to an inflection point detected on a curve of electrical characteristics of the resonator for each of the plurality of PRUs 430, 440, and 450. The electrical characteristics of the resonator may be calculated for each of the PRUs 430, 440, and 450. The electrical characteristics of the resonator may include any one or any combination of a voltage gain, a current gain, and a power gain of the resonator.

The controller 420 may determine that a PRU is located within the charging area when a frequency corresponding to a first detected inflection point is less than or equal to a preset reference frequency. The first inflection point may be detected by scanning a predetermined frequency band, for example, by increasing a frequency from a relatively low frequency to a relatively high frequency, on the curve of the electrical characteristics of the resonator for each of the plurality of PRUs 430, 440, and 450. Through such calculation, all of the PRUs 430, 440, and 450, or some of the PRUs 430, 440, and 450, for example, the PRU 440, may be determined to be located within the charging area.

The communication unit 460 may perform in-band communication or out-of-band communication to receive information on powers received by the plurality of PRUs 430, 440, and 450 and information on powers to be used by the plurality of PRUs 430, 440, and 450 from the resonating unit 410.

The controller 420 may calculate any one or any combination of the voltage gain, the current gain, and the power gain of the resonator based on the received information on the powers received by the PRUs 430, 440, and 450 by scanning a frequency band. To reduce a power consumption until it is determined which one or ones of the PRUs 430, 440, and 450 are located within the charging area, the controller 420 may calculate the electrical characteristics of the resonator using a test power rather than a charging power.

The controller 420 controls an amount of power to transmit a power corresponding to a power to be used by a PRU determined to be located within the charging area among the plurality of PRUs 430, 440, and 450 based on the received information on the powers to be used by the plurality of PRUs 430, 440, and 450. The resonating unit 410 transmits the power controlled by the controller 420 to the one or ones of the PRUs 430, 440, and 450 that are located within the charging area.

Figure 5:
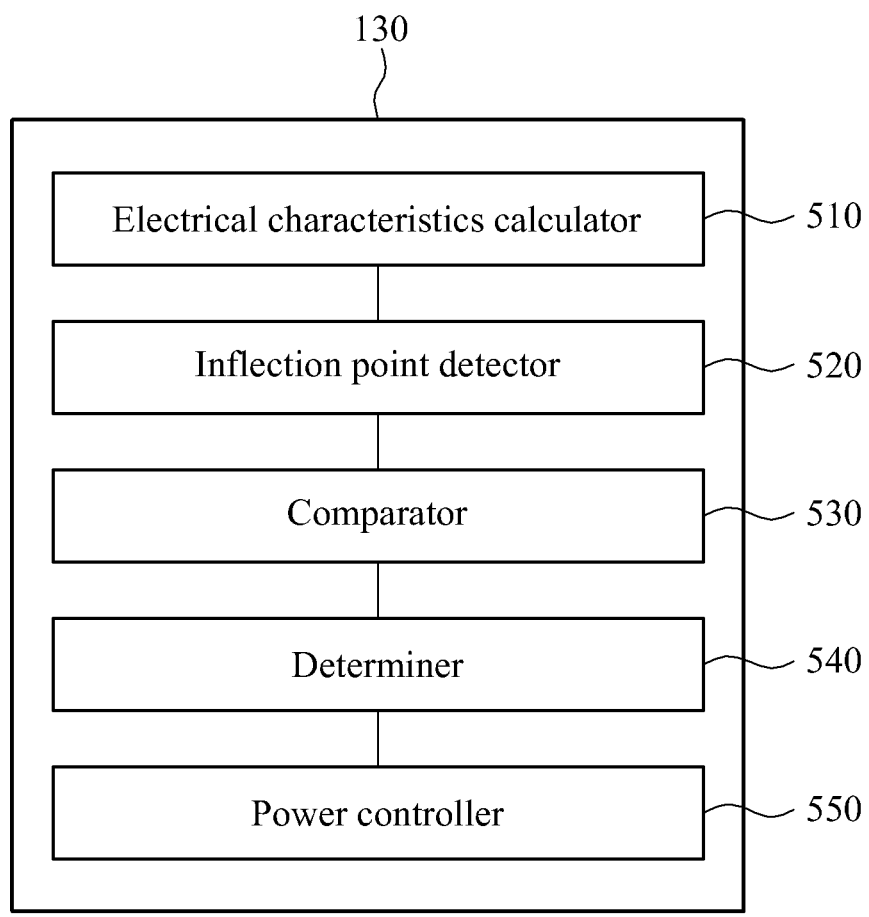
FIG. 5 illustrates an example of a configuration of a controller of a PTU.

FIG. 5 illustrates an example of a configuration of the controller 130 of FIG. 1.

Referring to FIG. 5, the controller 130 includes an electrical characteristics calculator 510, an inflection point detector 520, a comparator 530, a determiner 540, and a power controller 550.

The electrical characteristics calculator 510 calculates electrical characteristics of a resonator of a PTU based on information received from a PRU. The electrical characteristics of the resonator may include voltage gain characteristics, current gain characteristics, and power gain characteristics. The electrical characteristics calculator 510 may calculate the electrical characteristics of the resonator by scanning a predetermined frequency band. As a result of the calculating, a curve of the electrical characteristics at each frequency in the predetermined frequency band may be obtained.

The inflection point detector 520 may detect an inflection point of the curve by scanning a predetermined frequency band on the curve of the calculated electrical characteristics, for example, by scanning frequencies from a relatively low frequency to a relatively high frequency. The inflection point detector 520 may detect the inflection point of the curve by searching for a point at which a second order derivative value of the curve is equal to 0.

The comparator 530 compares a frequency corresponding to a first detected inflection point to a preset reference frequency. The reference frequency may be set to correspond to a desired coupling coefficient based on the first inflection point. In another example, the comparator 530 may compare a frequency corresponding to an odd-numbered inflection point to the preset reference frequency.

The determiner 540 determines whether the PRU is located within a charging area based on a result of the comparing performed by the comparator 530. When the corresponding frequency is less than or equal to the reference frequency, the determiner 540 determines that the PRU is located within the charging area. In another example, the determiner 540 may determine that the PRU is located within the charging area in a case in which the corresponding frequency is higher than the reference frequency. In this example, it may be assumed that a frequency corresponding to an inflection point increases as a coupling coefficient increases. When the PRU is determined to be located within the charging area, the PTU transmits a power to the PRU. The PTU may inform a user that a power is being transmitted to the PRU using any one or any combination of a visual feedback, a tactile feedback, and an auditory feedback. The visual feedback may be a method of providing visual information to a user using a display device. The tactile feedback may be a method of providing information using an oscillating device. The auditory feedback may be a method of providing information using a speaker. The display device, the oscillating device, and the speaker may be included in the PRU or the PTU.

When the PRU is determined not to be located within the charging area, the PTU may provide a user with any one or any combination of a visual feedback, a tactile feedback, and an auditory feedback. The user receiving such a feedback may correct a physical location, for example, a distance or an angle, of the PRU to reposition the PRU within the charging area. When the PRU is determined not to be located within the charging area, the PTU may suspend power transmission.

The power controller 550 controls an amount of power to be transmitted to the PRU based on whether the PRU is located within the charging area, and information on a power to be used by at least one PRU located within the charging area. The power controller 550 may transmit an amount of power corresponding to the power to be used by the PRU located within the charging area.

Figure 6:
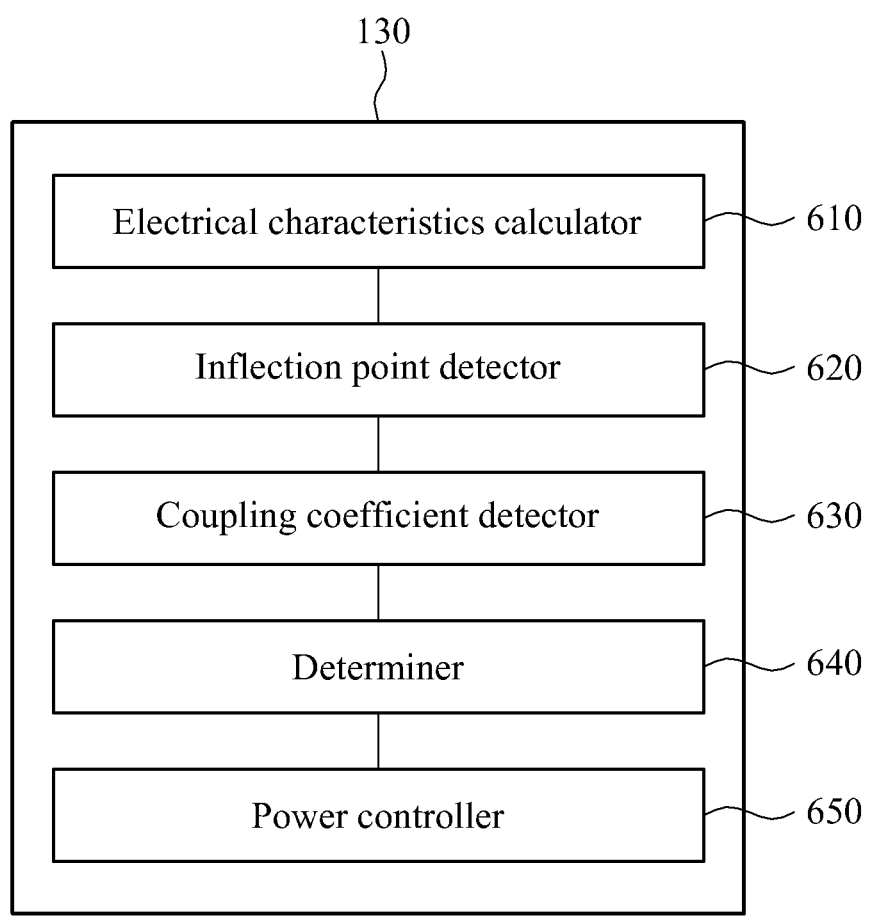
FIG. 6 illustrates another example of a configuration of a controller of a PTU.

FIG. 6 illustrates another example of a configuration of the controller 130 of FIG. 1.

Referring to FIG. 6, the controller 130 includes an electrical characteristics calculator 610, an inflection point detector 620, a coupling coefficient detector 630, a determiner 640, and a power controller 650.

The electrical characteristics calculator 610 calculates electrical characteristics of a resonator of a PTU based on information received from a PRU. The electrical characteristics of the resonator may include voltage gain characteristics, current gain characteristics, and power gain characteristics. The electrical characteristics calculator 610 may calculate the electrical characteristics of the resonator by scanning a predetermined frequency band. As a result of the calculating, a curve of electrical characteristics at each frequency in the predetermined frequency band may be obtained.

The inflection point detector 620 detects an inflection point of the curve by scanning a predetermined frequency band on the curve of the calculated electrical characteristics. The inflection point detector 620 may detect the inflection point of the curve by searching for a point at which a second order derivative value of the curve is equal to 0.

The coupling coefficient detector 630 detects a current coupling coefficient based on a coupling coefficient corresponding to the inflection point detected by the inflection point detector 620 and a calculated change in a coupling coefficient. The coupling coefficient detector 630 may calculate the change in the coupling coefficient based on a voltage of a capacitor of the resonator included in the resonating unit 120 of FIG. 1. Since a change in a coupling coefficient will affect a voltage of a capacitor at a transmission terminal, the coupling coefficient detector 630 may calculate the change in the coupling coefficient by monitoring the voltage of the capacitor of the resonator included in the resonating unit 120. A relationship between the voltage of the capacitor at the transmission terminal and the coupling coefficient will be described in detail with reference to FIGS. 7A through 7D.

The determiner 640 determines that the PRU is located within a charging area when the coupling coefficient detected by the coupling coefficient detector 630 is greater than or equal to a predetermined coupling coefficient.

When the coupling coefficient is determined from the inflection point detected by the electrical characteristics calculator 610 and the inflection point detector 620, the controller 130 may determine the location of the PRU through the coupling coefficient detector 630 and the determiner 640 without any further operations of the electrical characteristics calculator 610 and the inflection point detector 620. In greater detail, when the electrical characteristics calculator 610 and the inflection point detector 620 determine the current coupling coefficient, the controller 130 may continuously monitor the current coupling coefficient based on the change in the coupling coefficient, and determine the location of the PRU through the monitoring of the coupling coefficient.

When the PRU is determined to be located within the charging area, the PTU transmits a power to the PRU. The PTU may inform a user that a power is being transmitted to the PRU using any one or any combination of a visual feedback, a tactile feedback, and an auditory feedback.

When the PRU is determined not to be located within the charging area, the PTU may provide a user with any one or any combination of a visual feedback, a tactile feedback, and an auditory feedback. The user receiving such a feedback may correct a physical location, for example, a distance or an angle, of the PRU to reposition the PRU within the charging area.

The power controller 650 controls an amount of power to be transmitted to the PRU based on whether the PRU is located within the charging area, and information on a power to be used by at least one PRU located within the charging area. The power controller 650 may transmit an amount of power corresponding to the power to be used by the PRU located within the charging area.

Figure 7A:
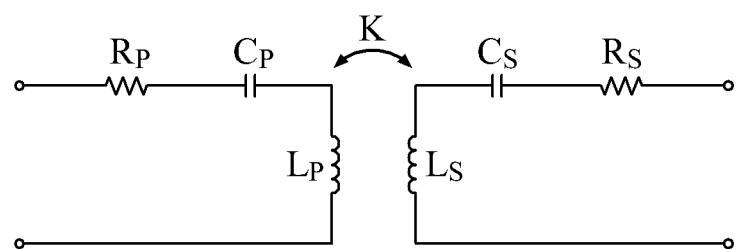
FIGS. 7A through 7D illustrate an example of a method of a PTU detecting a change in a coupling coefficient.
Figure 7B:
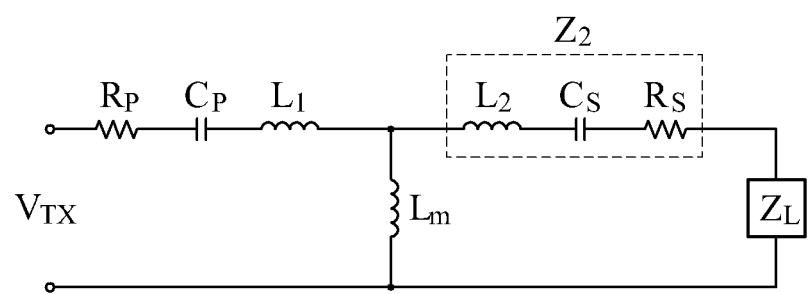
Figure 7C:
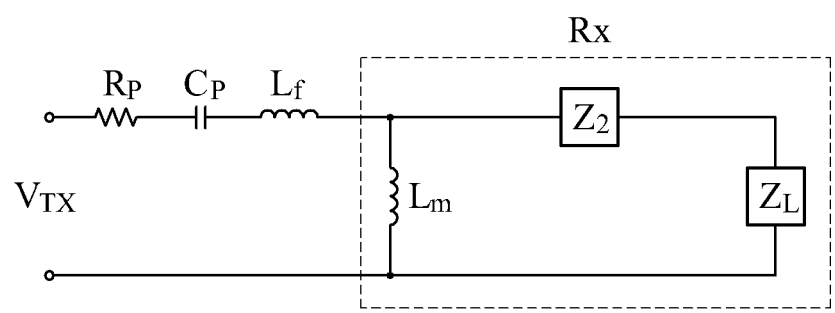
Figure 7D:
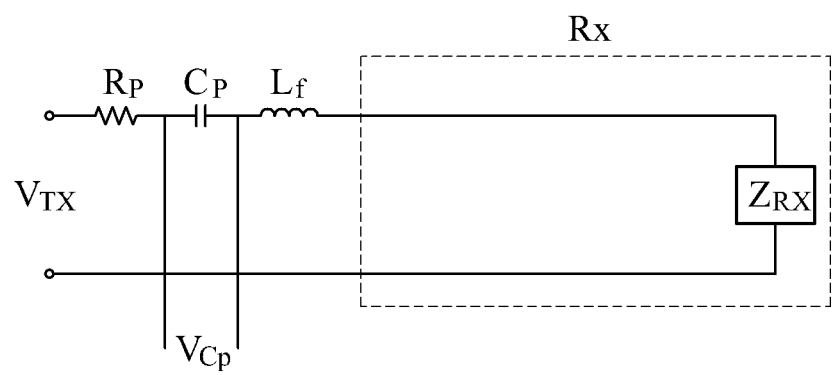

FIGS. 7A through 7D illustrate an example of a method of a PTU detecting a change in a coupling coefficient. In greater detail, FIG. 7A illustrates an example of a Π-type resonator model, FIG. 7B illustrates an example of a T-type equivalent circuit of the Π-type resonator model of FIG. 7A, FIG. 7C illustrates an example of a circuit in which $L_2$, $C_s$, and $R_s$ of a reception (Rx) terminal are expressed as $Z_2$, and FIG. 7D illustrates an example of a circuit in which a total impedance of the Rx terminal is expressed as $Z_{Rx}$.

Referring to FIG. 7B, a coupling coefficient K of FIG. 7A is converted into $L_m$. $L_m$ is defined as $L_m=K\sqrt{(L_pL_s)}$, $L_1$ is defined as $L_1=L_p-L_m$, $L_2$ is defined as $L_2=L_s-L_m$, and capacitances $C_p$ and $C_s$ and resistances $R_p$ and $R_s$ are unchanged. $V_{Tx}$ denotes a voltage of a transmission (Tx) terminal, and $Z_L$ denotes an impedance of a load.

FIGS. 7A through 7D illustrate a process of expressing $V_{Cp}$ using an equation related to $Z_{Rx}$.

The following Equation 2 expresses $Z_2$ of FIG. 7C using $L_2$, $C_s$, and $R_s$ of FIG. 7B, with $L_2$ and $C_s$ being multiplied by the Laplace variable s.

$$Z_2 = sL_2 + \frac{1}{sC_s} + R_s \quad (2)$$

The following Equation 3 expresses $Z_{Rx}$ of FIG. 7D using $Z_2$ and $Z_L$ of FIG. 7C.

$$Z_{Rx}=Z_2+Z_L \quad (3)$$

The following Equation 4 expresses $V_{Cp}$ when $V_{Tx}$ is applied to the Tx terminal, with $L_1$ and $C_p$ being multiplied by the Laplace variable s.

$$V_{Cp} = \frac{V_{Tx}}{(sC_p)\left(sL_1 + \frac{1}{sC_p} + R_p + Z_{Rx}\right)} \quad (4)$$

Referring to Equation 4, $Z_{Rx}$ appears in a denominator on a right-hand side, and thus it may be understood that a change in $Z_{Rx}$ will affect $V_{Cp}$. From Equations 2 and 3, $Z_{Rx}$ may be expressed using $Z_2$, and $Z_2$ may be expressed using $L_2$. Thus, it may be understood that a change in $L_2$ will result in a change in $Z_{Rx}$. In addition, since $L_2=L_s-L_m$ and $L_m=K\sqrt{(L_pL_s)}$, it may be understood that a change in the coupling coefficient K will result in a change in $L_m$ and a change in $L_2$. Thus, it may be understood that the change in the coupling coefficient K will result in a change in $V_{Cp}$. Accordingly, the change in the coupling coefficient K may be detected by measuring $V_{Cp}$.

A detection of a change in a coupling coefficient through measurement of voltages at both ends of $C_p$ is applicable to a series-series resonator as illustrated in FIGS. 7A through 7D, a series-parallel resonator, a parallel-series resonator, and a parallel-parallel resonator.

In another example, the PTU may determine whether the PRU is located within the charging area based on $V_{Cp}$ without detecting a coupling coefficient. Since a change in $V_{Cp}$ reflects a change in a location of the PRU, the PTU may determine the location of the PRU based on $V_{Cp}$ independently from the coupling coefficient.

The PTU may set $V_{Cp}$ when the PRU is located within the charging area as a reference value, and compare a measured $V_{Cp}$ to the reference value to determine whether the PRU is located within the charging area. In one example, the PTU may monitor $V_{Cp}$, and determine that the PRU is located within the charging area when the measured $V_{Cp}$ is greater than a preset reference $V_{Cp}$. In another example, the PTU may determine whether the PRU is located within the charging area based on a shape of a graph showing the change in $V_{Cp}$.

Figure 8:
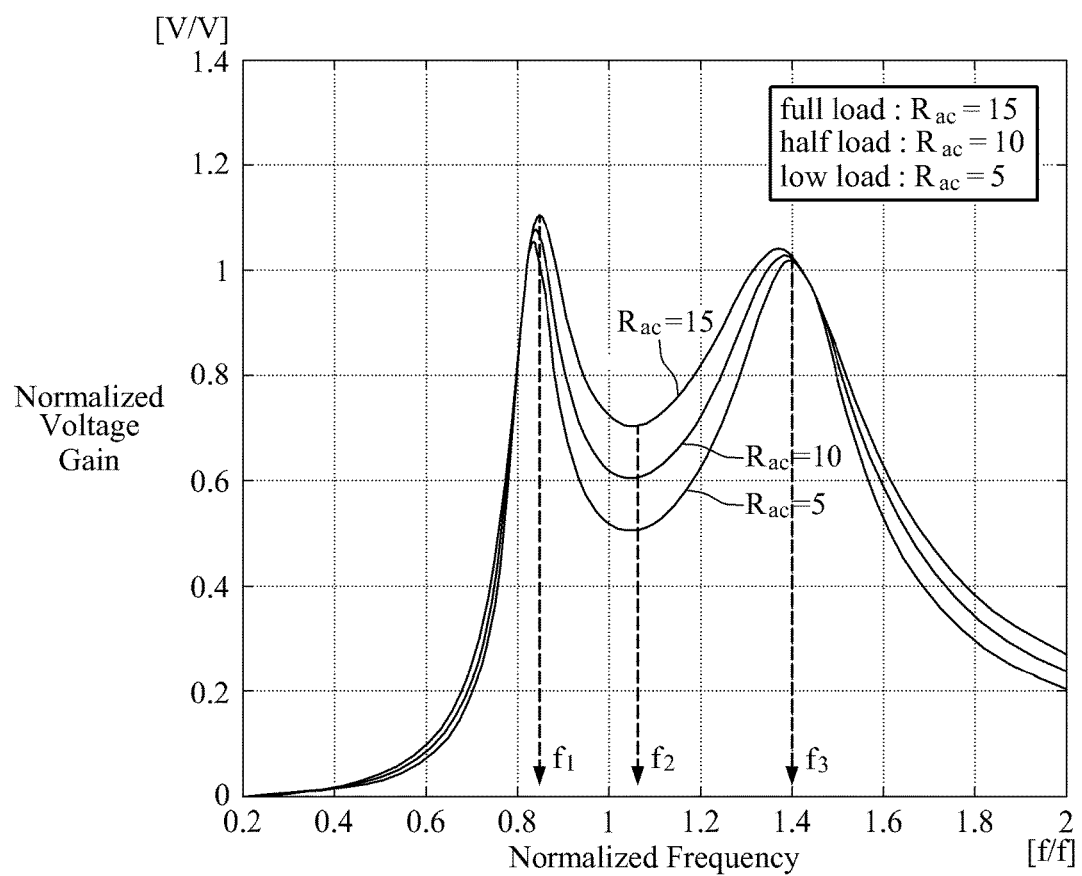
FIG. 8 illustrates examples of curves of a voltage gain of a resonator with respect to a change in a load of a PTU.

FIG. 8 illustrates examples of curves of a voltage gain of a resonator with respect to a change in a load of a PTU. Referring to FIG. 8, the load $R_{ac}$ represents a battery voltage state of a PRU. As a battery is charged, a value of the load decreases.

In FIG. 8, $f_1$, $f_2$, and $f_3$ denote resonant frequencies of a resonator, and may be determined based on a ratio of $L_1$, $C_p$, and $L_m$ of FIG. 7B. The voltages gain curves of FIG. 8 are measured while a coupling coefficient is unchanged. Referring to FIG. 8, a voltage gain at the resonant frequency $f_2$ changes based on the load, whereas voltage gains at the resonant frequencies $f_1$ and $f_3$ remain constant. In addition, since the coupling coefficient does not change, the resonant frequencies $f_1$ and $f_3$ based on each load are constant. The fact that the resonant frequency is constant when the coupling coefficient is constant indicates that the location of the PRU may be determined based on the coupling coefficient in lieu of the resonant frequency. For example, when a frequency corresponding to a first inflection point, for example, the first resonant frequency $f_1$ of FIG. 8, is less than or equal to a predetermined frequency, the PRU may be determined to be located within the charging area. Similarly, when a measured coupling coefficient is greater than or equal to a predetermined coupling coefficient, the PRU may be determined to be located within the charging area.

Figure 9:
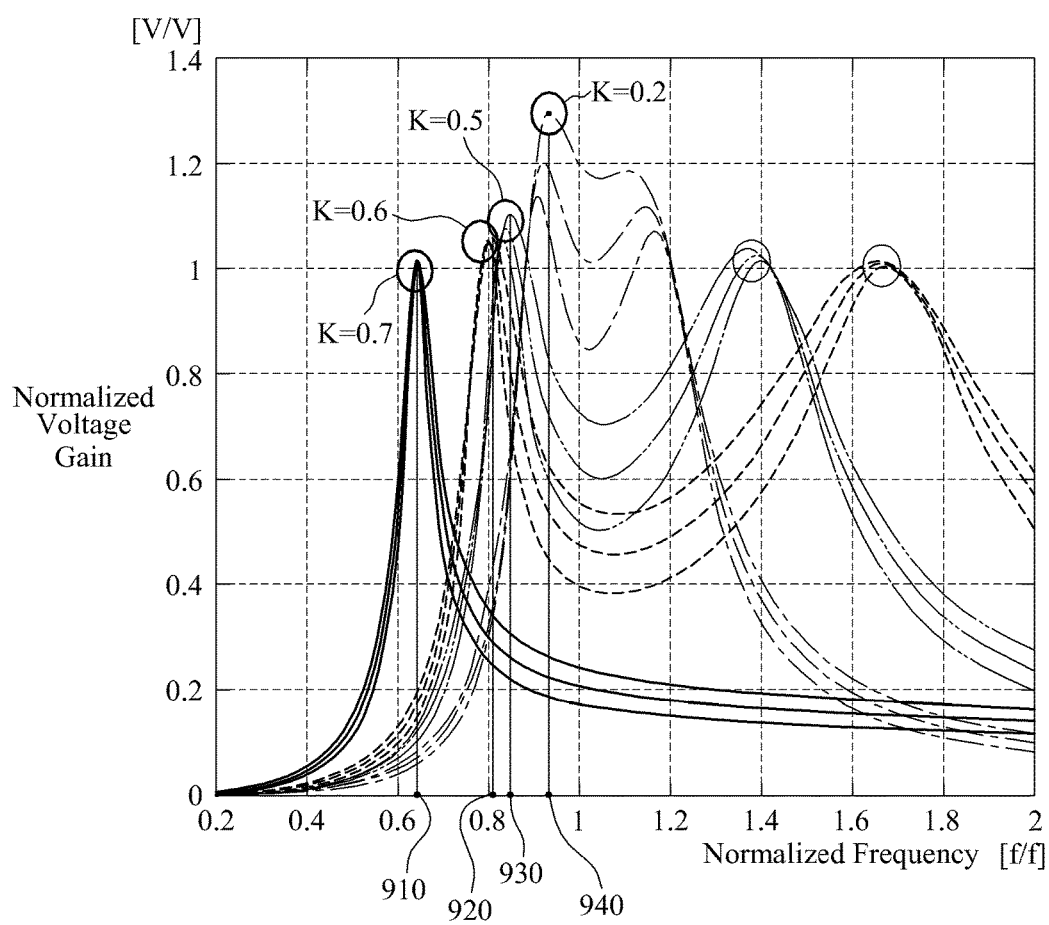
FIG. 9 illustrates examples of curves of a voltage gain of a resonator with respect to a change in a coupling coefficient of a PTU.

FIG. 9 illustrates examples of curves of a voltage gain of a resonator with respect to a change in a coupling coefficient of a PTU. Referring to FIG. 9, a curve of electrical characteristics, for example, voltage gain characteristics, of a resonator changes based on a coupling coefficient K. The coupling coefficient may be used as a criterion that expresses a transmission efficiency of a power to be transferred from a PTU to a PRU. An increase in the coupling coefficient indicates that the transmission efficiency increases, and a decrease in the coupling coefficient indicates that the transmission efficiency decreases.

Whether the PRU is located within the charging area of the PTU may be determined based on the coupling coefficient and a frequency corresponding to an inflection point of the curve of the voltage gain characteristics. For example, the coupling coefficient may be detected based on the frequency corresponding to the inflection point of the curve of the voltage gain characteristics. When the detected coupling coefficient is greater than or equal to a predetermined coupling coefficient, the PRU may be determined to be located within the charging area of the PTU.

As the coupling coefficient increases, a frequency corresponding to a first inflection point of the curve of the voltage gain characteristics decreases. When a desired coupling coefficient is preset, the corresponding frequency of the first inflection point corresponding to the desired coupling coefficient may be determined. The corresponding frequency may be used as a reference frequency to determine whether the PRU is located within the charging area.

When a distance or an angle between the PTU and the PRU is changed, the coupling coefficient K changes, and $L_m$ may be determined based on the coupling coefficient K. Thus, a resonant frequency may also be changed. In this example, $L_m$ denotes a virtual inductance added when an Π-type resonator model is equivalently converted to a T-type model, and is illustrated in FIG. 7B. As the coupling coefficient K decreases, a distance between resonant frequencies decreases and a voltage gain at each resonant frequency increases. As the coupling coefficient K increases, the frequency corresponding to the first inflection point on the curve of the voltage gain characteristics gradually decreases. A corresponding frequency 910 in a case of K=0.7 is less than a corresponding frequency 920 in a case of K=0.6, a corresponding frequency 930 in a case of K=0.5, and a corresponding frequency 940 in a case of K=0.2.

Since the first inflection point of the curve of the voltage gain characteristics changes based on the coupling coefficient K, irrespective of the load, the coupling coefficient K between the PTU and the PRU may be determined based on the inflection point. For example, when the desired coupling coefficient is set to 0.7, the reference frequency is set to be the frequency 910. The PTU detects a first inflection point on a curve of voltage gain characteristics of a resonator, and calculate a frequency corresponding to the detected first inflection point. When the calculated frequency is less than the frequency 910, the PRU is determined to be currently located within the charging area. When the calculated frequency is higher than the frequency 910, the PRU is determined to be located out of the charging area.

The PTU may detect a change in the coupling coefficient K without receiving particular information from the PRU. When the PTU determines the coupling coefficient K between the PTU and the PRU based on an inflection point, the PTU may detect a change in the coupling coefficient K and determine whether the PRU is present within the charging area.

Figure 10A:
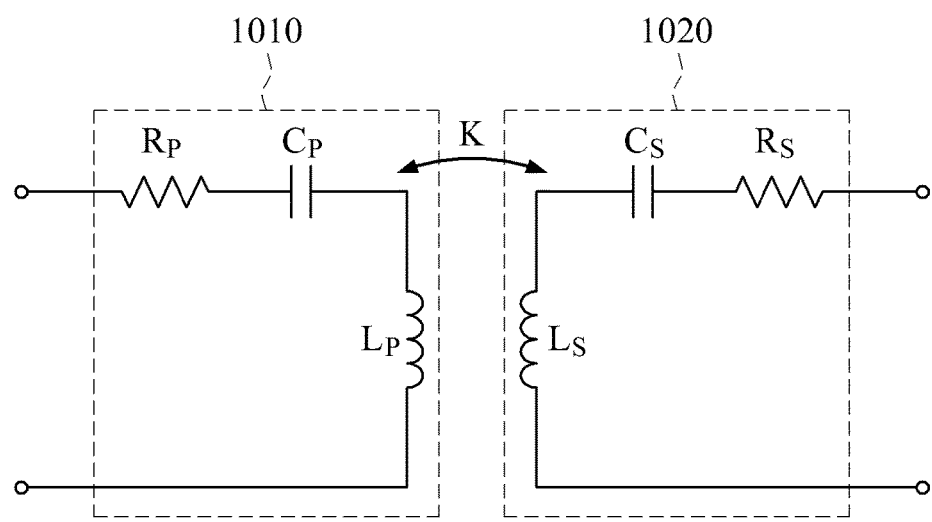
FIGS. 10A and 10B illustrate examples of a resonator model of a resonating unit of a PTU.
Figure 10B:
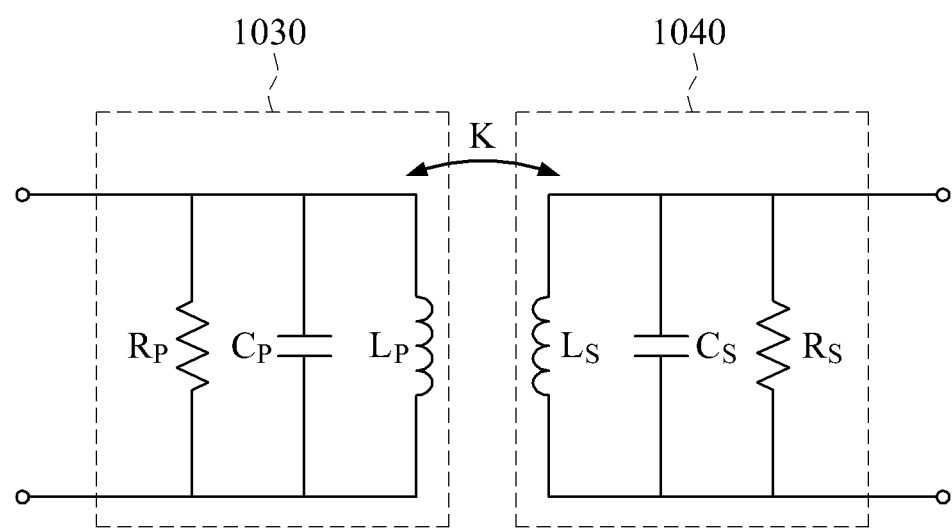

FIGS. 10A and 10B illustrate examples of a resonator model of a resonating unit of a PTU.

A resonator may be designed in various forms. FIG. 10A illustrates an example of a series resonator in which a resistor, a capacitor, and an inductor are connected in series with each other, and FIG. 10B illustrates an example of a parallel resonator in which a resistor, a capacitor, and an inductor are connected in parallel with each other. In FIG. 10A, a resonator 1010 is a series resonator, and may be provided in a PTU, and a resonator 1020 is a series resonator, and may be provided in a PRU. In FIG. 10B, a resonator 1030 is a parallel resonator, and may be provided in a PTU, and a resonator 1040 is a parallel resonator, and may be provided in a PRU.

Although not illustrated in FIGS. 10A and 10B, in another example, the series resonator 1010 may be provided in a PTU, and the parallel resonator 1040 may be provided in a PRU. In still another example, the parallel resonator 1030 may be provided in a PTU, and the series resonator 1020 may be provided in a PRU.

Figure 11:
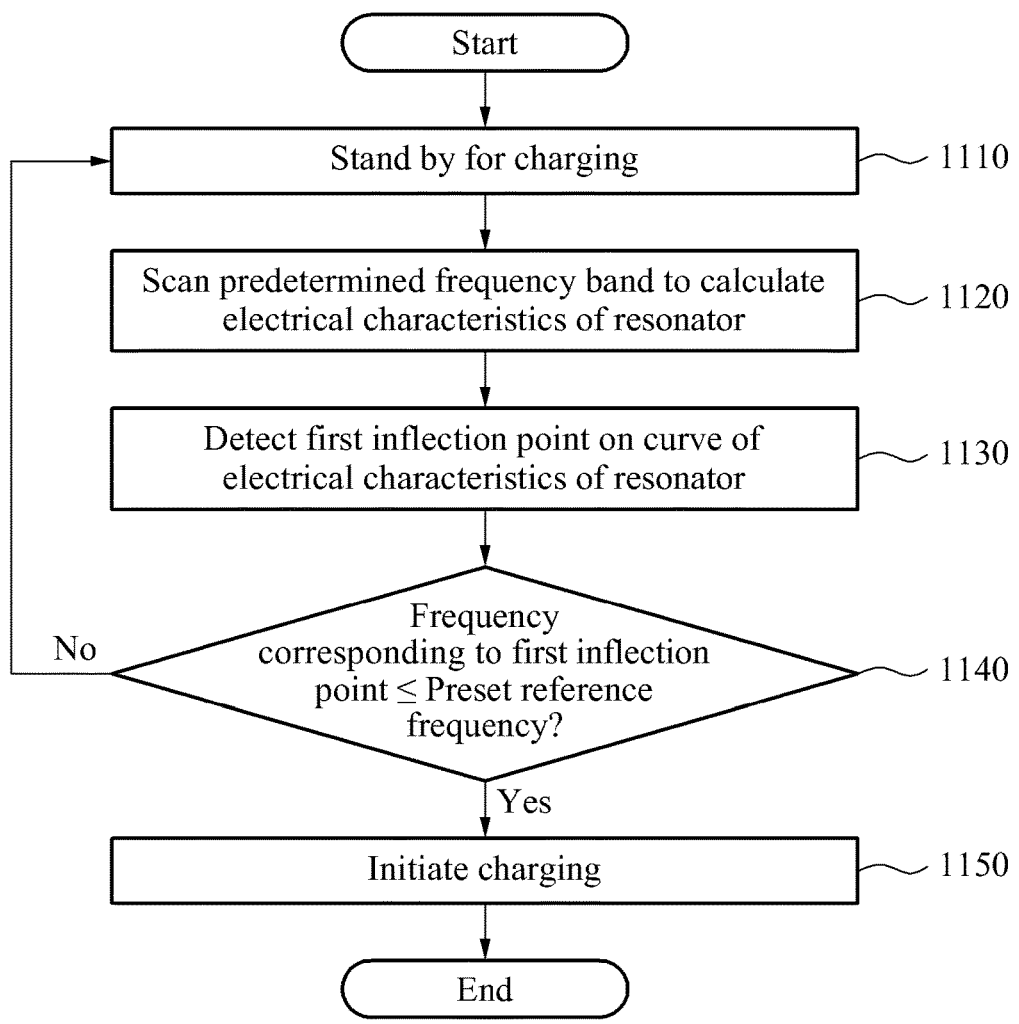
FIG. 11 illustrates an example of a method of a PTU for determining a location of a power receiving unit (PRU).

FIG. 11 illustrates an example of a method of a PTU for determining a location of a PRU Referring to FIG. 11, in operation 1110, the PTU is in a charging stand-by state and stands by for charging.

In operation 1120, the PTU calculates electrical characteristics of a resonator by scanning a predetermined frequency band. The electrical characteristics of the resonator may include any one or any combination of a voltage gain, a current gain, and a power gain of the resonator.

In operation 1130, the PTU detects a first inflection point on a curve of the electrical characteristics of the resonator. For example, a first point at which a second order derivative value of the curve is equal to 0 may be detected as the first inflection point.

In operation 1140, the PTU determines whether a frequency corresponding to the first inflection point is less than or equal to a preset reference frequency.

When the corresponding frequency is less than or equal to the preset reference frequency, the PTU initiates charging in operation 1150. When the corresponding frequency is greater than the preset reference frequency, the PTU returns to operation 1110 to stand by for charging.

FIG. 12 illustrates another example of a method of a PTU for determining a location of a PRU.

Referring to FIG. 12, in operation 1210, the PTU is in a charging stand-by state and stands by for charging.

In operation 1220, the PTU calculates electrical characteristics of a resonator for each of a plurality of PRUs by scanning a predetermined frequency band. The electrical characteristics of the resonator may include any one or any combination of a voltage gain, a current gain, and a power gain of the resonator.

In operation 1230, the PTU detects a first inflection point on a curve of the electrical characteristics of the resonator of each PRU.

In operation 1240, the PTU compares a frequency corresponding to the first inflection point of each PRU to a preset reference frequency.

In operation 1250, the PTU determines a PRU for which the corresponding frequency is less than or equal to the preset reference frequency to be located within a charging area. The corresponding frequency may be changed in each calculation, whereas the preset reference frequency may be the same for all PRUs.

In operation 1260, the PTU controls a power to be transmitted based on a power to be used by each PRU located within the charging area.

In operation 1270, the PTU initiates charging of each PRU located within the charging area with the controlled power.

In one example, a PTU may easily determine whether a PRU is located within a charging area based on a frequency corresponding to an inflection point of a curve of electrical characteristics of a resonator.

In a case in which a plurality of PRUs are provided, the PRUs may be charged in a suitable environment based on location information of each PRU using the method described above.

The controller 130 and the communication unit 140 in FIG. 1, the controller 420 and the communication unit 460 in FIG. 4, the electrical characteristics calculator 510, the inflection point detector 520, the comparator 530, the determiner 540, and the power controller 550 in FIG. 5, the electrical characteristics calculator 610, the inflection point detector 620, the coupling coefficient detector 630, the determiner 640, and the power controller 650 in FIG. 6 that perform the various operations described with respect to FIGS. 7, 8, 11 and 12 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power transmitting unit (PTU) comprising:
    a resonating unit comprising a resonator and configured to transmit a power to a power receiving unit (PRU) that mutually resonates with the resonator at a resonant frequency of the resonator; and
    a controller configured to:
        detect an inflection point on a curve of detected electrical characteristics of the resonator, and
        determine that the PRU is located within an effective charging area of the PTU in response to a frequency corresponding to the inflection point being less than or equal to a reference frequency.

2. The PTU of claim 1, wherein the resonating unit is further configured to transmit a charging power to the PRU in response to the controller determining that the PRU is located within the charging area.

3. The PTU of claim 1, wherein the electrical characteristics of the resonator comprise any one or any combination of a voltage gain, a current gain, and a power gain of the resonator.

4. The PTU of claim 1, wherein:
the controller is further configured to determine that the PRU is located within the charging area in response to the frequency corresponding to the inflection point being less than or equal to the reference frequency; and
the inflection point is detected by scanning a predetermined frequency band on the curve.

5. A power transmitting unit (PTU) comprising:
a resonating unit comprising a resonator and configured to transmit a power to a power receiving unit (PRU) that mutually resonates with the resonator at a resonant frequency of the resonator; and
a controller configured to determine whether the PRU is located within a predetermined effective charging area of the PTU based on a comparison of a reference frequency with a frequency information corresponding to an inflection point on a curve of detected electrical characteristics of the resonator,
wherein the controller comprises:
an electrical characteristics calculator configured to calculate the electrical characteristics of the resonator based on information received from the PRU;
an inflection point detector configured to detect an inflection point of the curve by scanning a predetermined frequency band on the curve of the calculated electrical characteristics;
a comparator configured to compare a frequency corresponding to a first detected inflection point to a preset reference frequency; and
a determiner configured to determine whether the PRU is located within the charging area based on a result of the comparing.

6. The PTU of claim 1, wherein:
the resonator comprises a capacitor; and
the controller comprises:
an electrical characteristics calculator configured to calculate the electrical characteristics of the resonator based on information received from the PRU;
an inflection point detector configured to detect the inflection point of the curve by scanning a predetermined frequency band on a curve of the calculated electrical characteristics;
a coupling coefficient detector configured to detect a change in a coupling coefficient between the resonator and the PRU based on a voltage of the capacitor of the resonator; and
a determiner configured to determine whether the PRU is located within the charging area based on a coupling coefficient corresponding to a first inflection point, among detected inflection points of the curve, and the detected change in the coupling coefficient.

7. The PTU of claim 1, wherein:
the resonator has a shape of a two-dimensional (2D) pad; and
the controller is further configured to determine whether the PRU is located within the charging area on the 2D pad.

8. The PTU of claim 1, wherein:
the resonator has a shape configured to radiate the power to a three-dimensional (3D) space; and
the controller is further configured to determine whether the PRU is located within the charging area in the 3D space.

9. The PTU of claim 1, further comprising a communication unit configured to communicate with the PRU to receive information on a power received by the PRU and information on a power to be used by the PRU.

10. The PTU of claim 9, wherein:
the PRU comprises a reception resonator configured to receive the power;
the resonator of the resonating unit is either a series resonator or a parallel resonator; and
the reception resonator is either a series resonator or a parallel resonator.

11. A power transmitting unit (PTU) comprising:
a resonating unit comprising a resonator, the resonator comprising a capacitor, the resonating unit being configured to transmit a power to a power receiving unit (PRU) that mutually resonates with the resonator at a resonant frequency of the resonator; and
a controller configured to:
detect a change in a voltage of the capacitor,
calculate a change in a coupling coefficient between the PRU and the resonator based on the detected change in the voltage, and
determine whether the PRU is located within an effective charging area of the PTU based on the detected change in the coupling coefficient.

12. The PTU of claim 11, wherein the resonating unit is further configured to transmit the power to a PRU determined to be located within the charging area based on a result of the determining.

13. The PTU of claim 11, wherein the controller comprises:
an electrical characteristics calculator configured to calculate electrical characteristics of the resonator for each of a plurality of PRUs based on information received from the plurality of PRUs;
an inflection point detector configured to detect an inflection point of a curve of the calculated electrical characteristics by scanning a predetermined frequency band on the curve;
a comparator configured to compare a frequency corresponding to a first detected inflection point to a preset reference frequency; and
a determiner configured to determine a PRU located within the charging area, among the plurality of PRUs, based on a result of the comparing.

14. A method of a power transmitting unit (PTU) for determining a location of a power receiving unit (PRU), the method comprising:
transmitting a power to a PRU that mutually resonates with a resonator of the PTU at a resonant frequency of the resonator;
detecting an inflection point on a curve of detected electrical characteristics of the resonator; and
determining that the PRU is located within an effective charging area of the PTU in response to a frequency corresponding to the detected inflection point being less than or equal to a reference frequency.

15. The method of claim 14, wherein the transmitting comprises transmitting a charging power to the PRU in response to the PRU being determined to be located within the charging area.

16. The method of claim 14, wherein the electrical characteristics of the resonator comprise any one or any combination of a voltage gain, a current gain, and a power gain of the resonator.

17. The method of claim 14, wherein the determining comprises determining that the PRU is located within the charging area in response to a frequency corresponding to a first inflection point detected by scanning a predetermined frequency band on the curve being less than or equal to a preset reference frequency.

18. The method of claim 14, wherein the determining comprises:
calculating the electrical characteristics of the resonator based on information received from the PRU;
detecting an inflection point of the curve by scanning a predetermined frequency band on a curve of the calculated electrical characteristics;
comparing a frequency corresponding to a first detected inflection point to a preset reference frequency; and
determining whether the PRU is located within the charging area based on a result of the comparing.

19. The method of claim 14, wherein the determining comprises:
calculating the electrical characteristics of the resonator based on information received from the PRU;
detecting an inflection point of the curve by scanning a predetermined frequency band on the curve of the calculated electrical characteristics;
detecting a change in a coupling coefficient based on a voltage of a capacitor of the resonator; and
determining whether the PRU is located within the charging area based on a coupling coefficient corresponding to a first inflection point, among detected inflection points of the curve, and the detected change in the coupling coefficient.

20. The method of claim 14, further comprising communicating with the PRU to receive information on a power received by the PRU and information on a power to be used by the PRU.

21. A power transmitting unit (PTU) comprising:
a resonating unit comprising a resonator and configured to transmit a power to a power receiving unit (PRU) that mutually resonates with the resonator at a resonant frequency of the resonator; and
a controller configured to:
determine whether the PRU is located within a suitable charging area of the PTU based on a detected coupling coefficient between the resonator and the PRU; and
control the resonating unit to transmit a charging power to the PRU in response to the PRU being determined to be located within the predetermined suitable charging area.

22. The PTU of claim 21, wherein the controller is further configured to determine that the PRU is located within the charging area in response to the coupling coefficient being greater than or equal to a predetermined coupling coefficient.

23. The PTU of claim 21, wherein the controller is further configured to determine the coupling coefficient based on an inflection point on a curve of electrical characteristics of the resonator.

* * * * *